(12) United States Patent
Takita

(10) Patent No.: US 7,831,137 B2
(45) Date of Patent: Nov. 9, 2010

(54) IMAGE APPARATUS WITH SELECTIVE IMAGE COMPENSATION

(75) Inventor: Mark Takita, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 1083 days.

(21) Appl. No.: 11/390,685

(22) Filed: Mar. 28, 2006

(65) Prior Publication Data

US 2007/0230940 A1  Oct. 4, 2007

(51) Int. Cl.
G03B 7/08 (2006.01)
G03B 17/08 (2006.01)

(52) U.S. Cl. .................. 396/25; 396/225; 396/234

(58) Field of Classification Search .......... 396/25, 396/213, 225; 348/81, 223.1
See application file for complete search history.

(56) References Cited

U.S. PATENT DOCUMENTS

| | | | | |
|---|---|---|---|---|
| 5,282,022 | A * | 1/1994 | Haruki et al. | 348/223.1 |
| 5,282,024 | A * | 1/1994 | Takei | 348/223.1 |
| 5,365,290 | A * | 11/1994 | Suzuki et al. | 396/26 |
| 5,438,363 | A | 8/1995 | Ejima et al. | |
| 5,550,587 | A * | 8/1996 | Miyadera | 348/223.1 |
| 5,568,194 | A * | 10/1996 | Abe | 348/223.1 |
| 6,788,812 | B1 * | 9/2004 | Wilkins | 382/167 |
| 6,933,956 | B2 * | 8/2005 | Sato et al. | 345/690 |
| 6,970,578 | B1 * | 11/2005 | Strand | 382/103 |
| 7,148,922 | B2 * | 12/2006 | Shimada | 348/224.1 |
| 2004/0041941 | A1 | 3/2004 | Takeshita | |
| 2005/0195290 | A1 | 9/2005 | Takeshita | |
| 2005/0264685 | A1 | 12/2005 | Hoshuyama | |
| 2006/0045512 | A1 * | 3/2006 | Imamura et al. | 396/225 |

(Continued)

FOREIGN PATENT DOCUMENTS

JP  2004-282460  10/2004

(Continued)

OTHER PUBLICATIONS

Olympus USA America, Olympus Stylus 770 SW Goes Where No Other Digital Point-And-Shoot Camera Has Gone Before, Jan. 25, 2007, p. 1-5, http://www.olympususamerica.com/cpg_section/cpg_ PressDetails.asp?pressNo=524, CenterValley, PA, United States.

(Continued)

Primary Examiner—W. B. Perkey
(74) Attorney, Agent, or Firm—Roeder & Broder LLP

(57) ABSTRACT

An image apparatus (10) for providing an adjusted image (474) of a scene (12) that includes an photo-emissive object (18) includes an apparatus frame (228), a capturing system (232), and a control system (236). The capturing system (232) captures a raw captured image (466) of the scene (12). The control system (236) identifies a captured photo-emissive object (418) in the raw captured image (466). Further, the control system (236) can perform a different level of image compensation on the captured photo-emissive object (418) than on other portions of the captured image (466). Stated in another fashion, the control system (236) can perform a first level of white balance correction on at a first region (482A) of the captured image (466) and can perform a second level of white balance correction on a second region (482B) of the captured image (466). With this design, the control system (236) can provide the adjusted image (474) having a more uniform and acceptable white balance correction.

21 Claims, 6 Drawing Sheets

U.S. PATENT DOCUMENTS

2006/0257132 A1* 11/2006 Shiffer et al. ............... 396/158

OTHER PUBLICATIONS

The Nikon Guide to Digital Photography with the D2x Digital Camera by Nikon Corporation. The D2x digital camera was released on Feb. 25, 2005.

Proceedings of the 2004 IEEE Computer Society Conference on Computer Vision and Pattern Recognition (CVPR'04) 1063-6919/04.

Model No. GM 5WA06200Z by SHARP—Built-in 3-chip, Super-luminosity Chip LED, as of Apr. 2001.

http://optics.org/aticles/news/10/10/14/1 Dated Dec. 10, 2004, Lamina Ceramics LED array.

Luxeon Flash LXCL-PWF1—Technical Datasheet DS49. Dated Nov. 12, 2004, Lumileds Future Electronics.

* cited by examiner

IMAGE APPARATUS WITH SELECTIVE IMAGE COMPENSATION

BACKGROUND

Cameras are commonly used to capture an image of a scene. The color of light reflected from an object will vary according to the color of the light source that is illuminating the scene. As a result thereof, for example, if the color of the light source is yellow, a white object in the scene will not be captured as a white object with a typical film type camera. Recently, some digital cameras have been designed that include a program that adjusts all of the colors in a captured image according to the color of the light source. This commonly referred to as white balance correction. With white balance correction, the digital camera can compensate for variations in the colors of a captured image caused by the light source, and the actual color of the objects in the scene are more accurately represented in an adjusted image.

Additionally, some cameras are waterproof and are used to capture an image of a scene that is underwater. It is well known that water absorbs longer wavelength light more rapidly then shorter wavelength light. As a result thereof, at shallow depths below water, for example, red structures in the scene no longer appear red. Further, some diving equipment is covered with photo-emissive materials which are emissive rather than reflective in nature. The photo-emissive materials absorb light energy and re-emit the light energy at a defined wavelength, e.g. fluorescent material; or the photo-emissive materials can use other sources of energy to emit light, e.g. a light panel, or an LED array for example. This being the case, the photo-emissive materials emit colors of a defined wavelength at a distance from the camera which is typically short, and therefore does not get appreciably attenuated by the water.

Moreover, because of the absorption of light, many underwater scenes require illumination from an underwater light source, such as a flashlight or an illumination system of the camera. As a result thereof, objects closer to the light source will tend to yield more red than object farther from the light source. Thus, the captured image may not accurately reflect the true colors of the scene.

As utilized herein, the terms "true colors" or "actual colors" shall mean the colors that are present with no light attenuation at the scene and the scene is illuminated with an even white light.

SUMMARY

The present invention is directed to an image apparatus for providing an adjusted image of a scene that includes a photo-emissive object. The image apparatus includes an apparatus frame, a capturing system, and a control system. The capturing system captures a raw captured image of the scene. In one embodiment, the control system identifies a captured photo-emissive object in the raw captured image. With this design, in certain embodiments, the control system can perform a different level of image compensation on the captured photo-emissive object than on other portions of the captured image.

As provided herein, the control system can perform a first level of white balance correction on at a first region of the captured image and can perform a second level of white balance correction on a second region of the captured image. In this embodiment, for example, the captured photo-emissive object is located in the second region of the captured image. As a result thereof, the second level of white balance correction is performed on the captured photo-emissive object and the first level of white balance correction is performed on the first region of the captured image. With this design, the control system can provide the adjusted image having a more uniform and acceptable white balance correction.

In one embodiment, the control system identifies the captured photo-emissive object by evaluating the level of red, blue or green in the raw captured image. For example, if a region of the raw captured image has a red component that is greater than an EO red level, this region can be considered a captured photo-emissive object. Alternatively, if a region of the raw captured image has a green component that is greater than an EO green level, this region can be considered a captured photo-emissive object. With this design, for example, the software in the control system can be used to isolate this region from rest of the captured image. Stated in another fashion, the control system can perform white balance correction on a portion of the captured image and the control system can isolate the captured photo-emissive object from white balance correction.

The amount of red that is the EO red level and the amount of green that is the EO green level can depend on the attenuation of light in the fluid. For example, attenuation is largely dependent on the depth. Thus, the amount of red that qualifies as the threshold EO red level can depend upon the depth of the scene.

The present invention is also directed to another embodiment of an image apparatus for providing an adjusted image of a scene. In this embodiment, the control system performs a first level of white balance correction on at a first region of the captured image and performs a second level of white balance correction on a second region of the captured image, the second level of white balance correction being different than the first level of white balance correction.

In one version, the control system identifies the amount of red, green and/or blue in the captured image and performs white balance correction based on the amount of red, green or blue in the captured image. For example, the control system can perform the first level of white balance correction in an area having a first level of red and a second level of white balance correction in an area having a second level of red. Alternatively, for example, the control system can perform the first level of white balance correction in an area having a first level of green and a second level of white balance correction in an area having a second level of green. With this design, for example, if the scene is illuminated by a light source, the control system can perform different levels of white balance correction on the objects in the scene based on which objects are closest to the light source.

It should be noted that the image apparatuses provided herein are particularly useful for capturing an image of a scene that is under a fluid.

The present invention is also directed to a method for providing an adjusted image of a scene that is within a fluid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
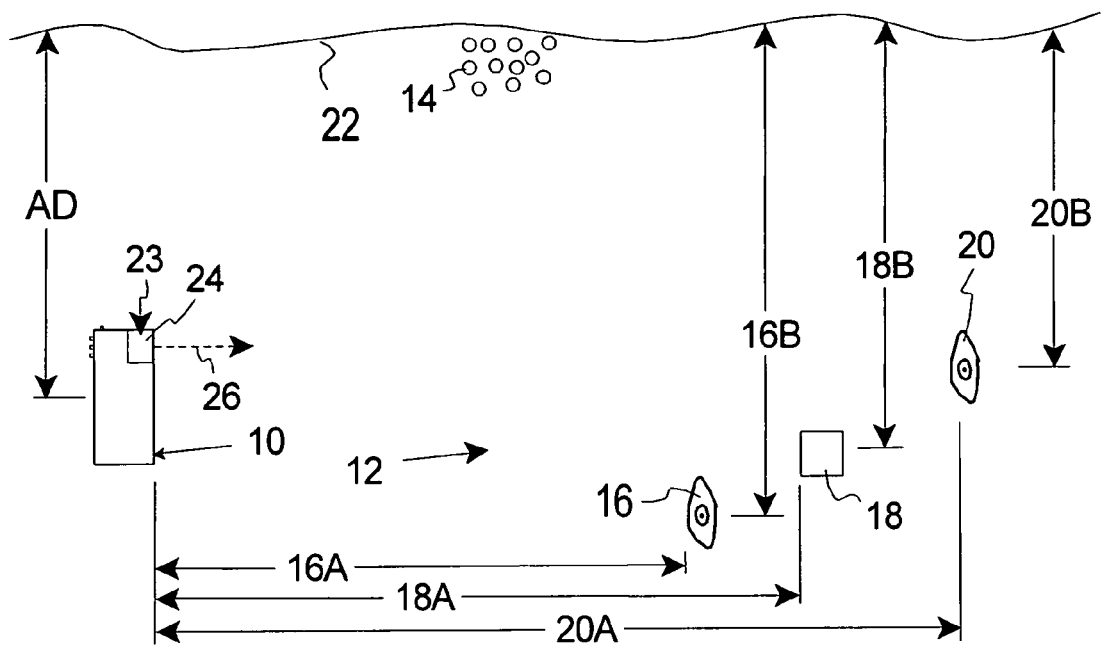
FIG. 1 is a simplified side plan illustration of a scene and an image apparatus having features of the present invention.

FIG. 1 is a simplified side plan illustration of an image apparatus 10 and a scene 12. The image apparatus 10 is useful for providing an adjusted image (not shown in FIG. 1) of the scene 12. The type of scene 12 captured by the image apparatus 10 can vary. In certain embodiments, the image apparatus 10 is waterproof and is adapted to capture images of one or more scenes 12 that are partly or fully under a fluid 14 (partly illustrated as a plurality of small circles), e.g. a liquid such as water. For example, each scene 12 can include one or more underwater animals, plants, mammals, fish, coral, objects, and/or environments. In FIG. 1, the scene 12 includes three spaced apart objects, namely a first object 16, a second object 18, and a third object 20. Alternatively, the scene 12 can include more than three or less than three objects 16, 18, 20.

The type of object 16, 18, 20 represented in the scene 12 can vary. In FIG. 1, the first object 16 is a first starfish 18, the second object 18 is a photo-emissive object, and the third object 20 is a second starfish. The photo-emissive object emits photoelectrons. The photo-emissive materials absorb light energy and re-emit the light energy at a defined wavelength, e.g. fluorescent material; or the photo-emissive materials can use other sources of energy to emit light, e.g. a light panel, or an LED array for example. The type of photo-emissive object can vary. For example, the photo-emissive object can be a piece of underwater (SCUBA) diving equipment that is colored with photo-emissive materials, such as fluorescent materials. The photo-emissive objects can preserve lost wavelengths absorbed by the fluid 14. Photo-emissive objects are often dominated by significant amounts of red.

The focal point of the scene 12 can vary. For example, the image apparatus 10 can be focused on one of the objects 16, 18, 20.

The distance between the image apparatus 10 and the objects 16, 18, 20 can vary. In FIG. 1, the first object 16 is at a first separation distance 16A away from the image apparatus 10, the second object 18 is at a second separation distance 18A away from the image apparatus 10, and the third object 20 is at a third separation distance 20A away from the image apparatus 10. In FIG. 1, the first object 16 is closest to the image apparatus 10 and the first separation distance 16A is the shortest, the second object 18 is farther from the image apparatus 10 than the first object 16 and the second separation distance 18A is longer than the first separation distance 16A, and the third object 20 is the farthest away from the image apparatus 10 and the third separation distance 20A is longer than the second separation distance 18A. Alternatively, for example, two or more of the objects 16, 18, 20 can be at approximately the same separation distance from the image apparatus 10.

In FIG. 1, for the photo-emissive object 18, the absorption path is the second separation distance 18A.

Attenuation of light is influenced by many factors including the total light path at which the captured image is captured. Further, longer wavelength light is attenuated more rapidly then shorter wavelength light. In FIG. 1, the first object 16 is positioned a first object depth 16B below a fluid surface 22, the second object 18 is positioned a second object depth 18B below the fluid surface 22, the third object 20 is positioned a third object depth 20B below the fluid surface 22, and the image apparatus 10 is at an apparatus depth AD below the fluid surface 22. For example, the apparatus depth AD can be greater than, less than or approximately equal to the object depths 16B, 18B, 20B. Further, the object depths 16B, 18B, 20B can vary.

As provided herein, the scene 12 can be illuminated by an underwater light source 23, e.g. a flashlight and/or an illumination system 24 of the image apparatus 10. In one embodiment, the illumination system 24 generates a generated light beam 26 (illustrated as dashed arrows) that illuminates the scene 12. It should be noted that for an underwater scene 12, because of the attenuation of light in the fluid 14 and the relatively rapid attenuation of red color, objects closest to the light source 23 will tend to yield more red than objects farther from the light source 23. In FIG. 1, the first object 16 is closest to the light source 23, the second object 18 is the next closest to the light source 23, and the third object 20 is the farthest from the light source 23. In this example, if the first object 16 and the third object 20 reflect an approximately equal intensity of red light, because the first object 16 is closer to the light source 23 than the third object 20, the first object 16 will appear more red than the third object 20 in the raw captured image.

In one embodiment, the image apparatus 10 is a digital camera that electronically stores the captured image. As provided herein, in certain embodiments, the image apparatus 10 includes selective white balance image correction on the raw captured image. More specifically, the image apparatus 10 evaluates and analyses the captured image to determine areas of captured photo-emissive objects and the image apparatus 10 performs white balance corrections of areas of the captured image that do not include the captured photo-emissive objects. Further, the image apparatus 10 can color compensate for different regions of the captured image at different rates. For example, the image apparatus 10 can color compensate the first object 16 at a different rate than the third object 20. This can yield more uniform and acceptable white balance in the adjusted image.

Figure 2A:
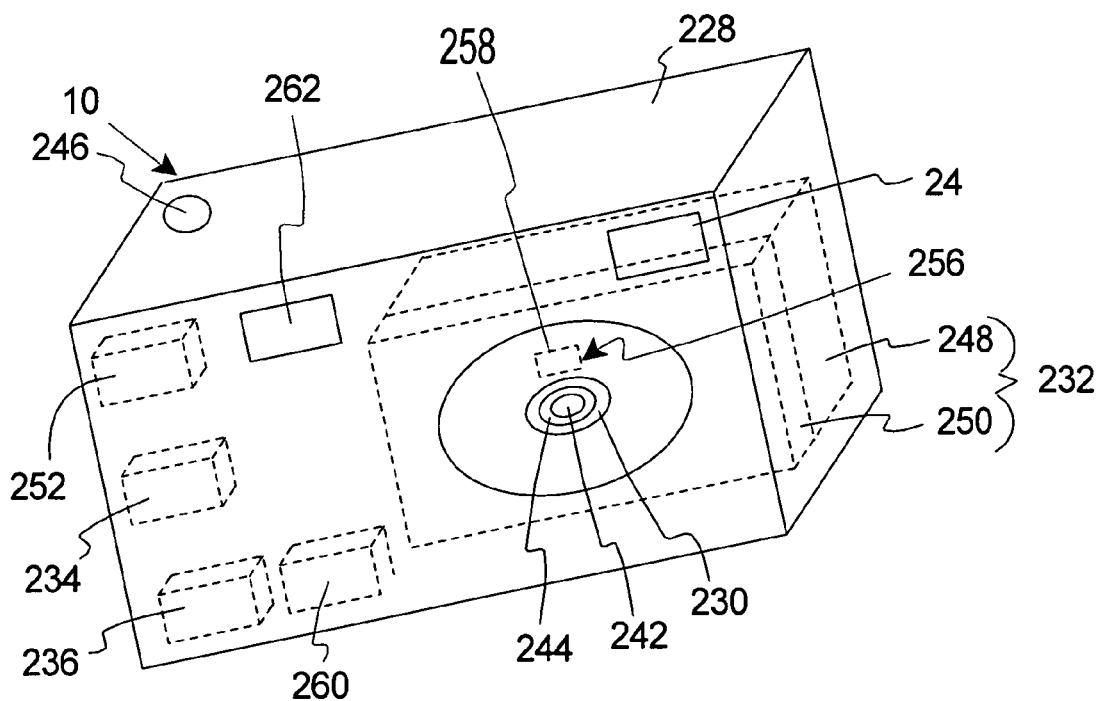
FIG. 2A is a simplified front perspective view of one embodiment of the image apparatus.

FIG. 2A illustrates a simplified, front perspective view of one, non-exclusive embodiment of the image apparatus 10. In this embodiment, the image apparatus 10 includes an apparatus frame 228, an optical assembly 230, a capturing system 232 (illustrated as a box in phantom), a power source 234 (illustrated as a box in phantom), the illumination system 24, and a control system 236 (illustrated as a box in phantom). The design of these components can be varied to suit the design requirements and type of image apparatus 10. Further, the image apparatus 10 could be designed without one or more of these components. For example, the image apparatus 10 could be designed without the illumination system 24.

The apparatus frame 228 can be rigid and support at least some of the other components of the image apparatus 10. In one embodiment, the apparatus frame 228 includes a generally rectangular shaped hollow body that forms a cavity that receives and retains at least a portion of the capturing system 232.

Figure 3:
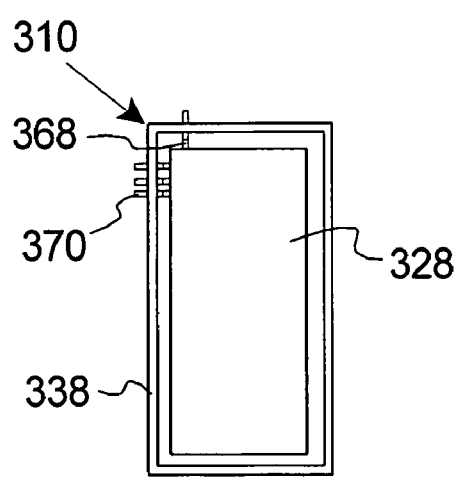
FIG. 3 is a simplified side plan illustration of another embodiment of an image apparatus having features of the present invention.

In one embodiment, the apparatus frame 228 is watertight. and forms a watertight compartment that protects the electronic components of the image apparatus 10. Alternatively, as illustrated in FIG. 3 and described below, the image apparatus 310 can be enclosed by an outer apparatus frame 338 that forms an outer shell that surrounds and encloses the image apparatus 310 and that provides a watertight barrier around the electronic components of the image apparatus 310.

Referring back to FIG. 2A, the apparatus frame 228 can include an aperture 242 and a shutter mechanism 244 that work together to control the amount of light that reaches the capturing system 232. The shutter mechanism 244 can include a pair of shutter blades that work in conjunction with each other to allow the light to be focused on the capturing system 232 for a certain amount of time. The shutter blades are activated by a shutter button 246.

The optical assembly 230 can include a single lens or a combination of lenses that work in conjunction with each other to focus light onto the capturing system 232.

The capturing system 232 captures the captured image (not shown in FIG. 2A). The design of the capturing system 232 can vary according to the type of image apparatus 10. For a digital type camera, the capturing system 232 includes an image sensor 248 (illustrated in phantom), a filter assembly 250 (illustrated in phantom), and a storage system 252 (illustrated in phantom).

The image sensor 248 receives the light that passes through the aperture 242 and converts the light into electricity. One non-exclusive example of an image sensor 248 for digital cameras is known as a charge coupled device ("CCD"). An alternative image sensor 248 that may be employed in digital cameras uses complementary metal oxide semiconductor ("CMOS") technology. CMOS devices use several transistors at each photosite to amplify and move the charge using more traditional wires.

The image sensor 248, by itself, produces a grayscale image as it only keeps track of the total intensity of the light that strikes the surface of the image sensor 248. Accordingly, in order to produce a full color image, the filter assembly 250 is necessary to capture the colors of the image.

It should be noted that other designs for the capturing system 232 can be utilized.

It should also be noted, as discussed in more detail below, that with information from the capturing system 232, the control system 236 can selectively compensate the colors in the raw captured image (not shown in FIG. 2A).

The storage system 252 stores the various captured images before the images are ultimately printed out, deleted, transferred or downloaded to an auxiliary compensation system (not shown in FIG. 2A), an auxiliary storage system or a printer. The storage system 252 can be fixedly or removably coupled to the apparatus frame 228. Non-exclusive examples of suitable storage systems 252 include flash memory, a floppy disk, a hard disk, or a writeable CD or DVD.

The power source 234 provides electrical power to the electrical components of the image apparatus 10. For example, the power source 234 can include one or more chemical batteries, either the one time use disposable batteries (such as alkaline, zinc-air), or the multiple use rechargeable batteries (such as nickel-cadmium, nickel-metal-hydride, lead-acid, lithium-ion).

The illumination system 24 provides the generated light beam 26 (illustrated in FIG. 1), e.g. a flash of light that can be used to selectively illuminate at least a portion of the scene 12.

In one embodiment, the image apparatus 10 includes an autofocus assembly 256 including one or more lens movers 258 that move one or more lenses of the optical assembly 230 in or out until the sharpest possible image of the subject is received by the capturing system 232. For example, the autofocus assembly 256 can be an active or passive type system.

With either autofocus system, the control system 236 can determine the separation distance between the optical assembly 230 and the subject of the scene 12.

Alternately or additionally, the image apparatus 10 can include a separate sensor (not shown) that determines the separation distance between the image apparatus 10 and the one or more objects 16, 18, 20 of the scene 12.

Additionally, the image apparatus 10 can include an apparatus depth sensor 260 that measures the depth of a portion of the image apparatus 10 under the fluid surface 22 (illustrated in FIG. 1). For example, the depth sensor 260 can measure the depth of the image apparatus 10 prior to, during and/or immediately after the image is captured with the capturing system 232. Further, the depth sensor 260 can provide an apparatus depth signal that is transferred to the control system 236 along with the corresponding raw captured image for subsequent processing with the control system 236. For example, the apparatus depth sensor 260 can be a pressure sensor that measures the pressure near the image apparatus 10. Still alternatively, the approximate depth can be manually input into the control system 236 by the user.

In one embodiment, the image apparatus 10 can include a RBG sensor 262 that measures the colors in the scene 12. For example, the RBG sensor 262 can be 1,005 pixel sensor that measures brightness, color, contrast, selected focus area, and subject-to-camera distance to the control system 236. Alternatively, for example, the RBG sensor 262 can have more than or less than 1,005 pixels.

The control system 236 is electrically connected to and controls the operation of the electrical components of the image apparatus 10. The control system 236 can include one or more processors and circuits and the control system 236 can be programmed to perform one or more of the functions described herein. In one embodiment, the control system 236 is coupled to the apparatus frame 228 and is positioned within the apparatus frame 228.

The control system 236 can provide an adjusted image of the scene 12. It should be noted that one or more of these factors used by the control system 236 can be manually input by the user into the control system 236 and/or measured by the image apparatus 10.

Figure 2B:
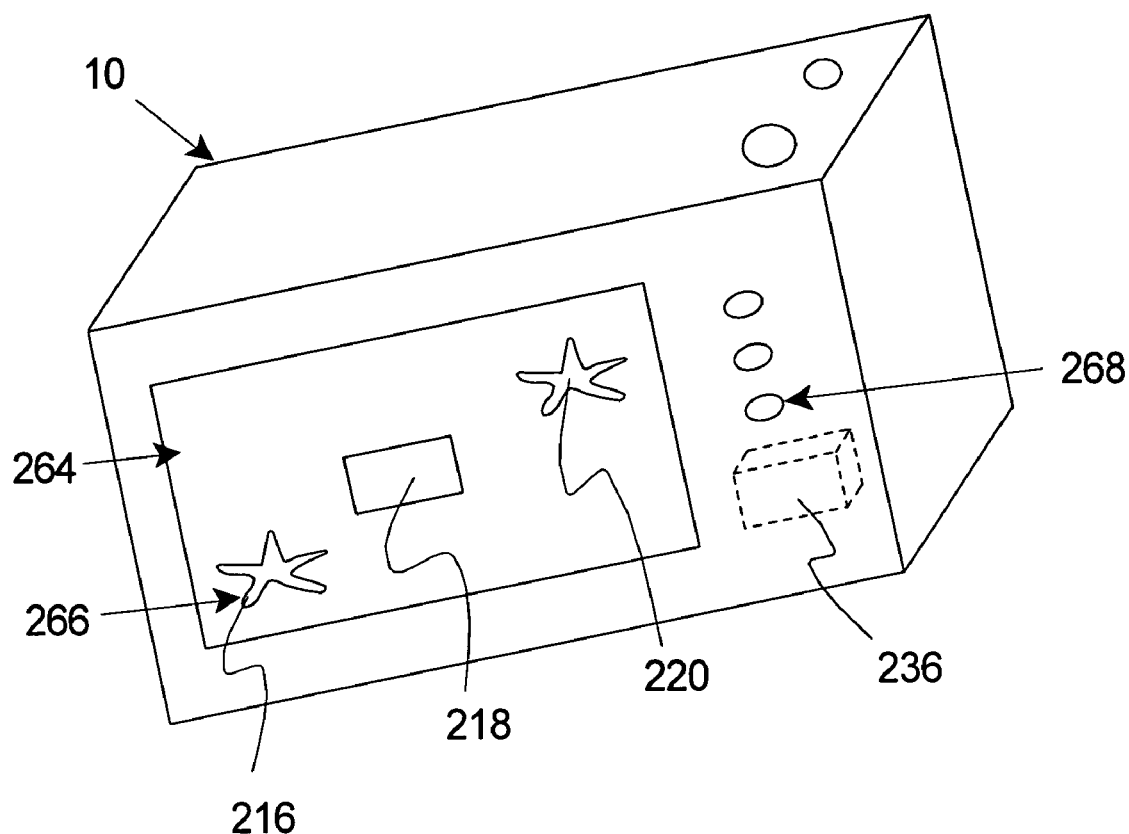
FIG. 2B is a simplified rear perspective view of the image apparatus of FIG. 2A.

Referring to FIG. 2B, additionally, the image apparatus 10 can include an image display 264 that displays a raw captured image 266 which was captured and/or the adjusted image. In FIG. 2B, the raw captured image 266 includes a captured first object 216, a captured second object 218, and a captured third object 220. Further, the image display 264 can display other information such as the time of day, the date, the apparatus depth, and/or the separation depth.

Moreover, the image apparatus 10 can include one or more control switches 268 electrically connected to the control system 236 that allows the user to control the functions of the image apparatus 10. For example, one or more of the control switches 268 can be used to manually input the separation distance and/or the apparatus depth.

Additionally, one or more of the control switches 268 can be used to selectively switch the image apparatus 10 to a compensation mode in which one or more of the compensation featured disclosed herein are activated.

In yet another embodiment, one or more of the control switches 268 can be used to bracket and/or highlight one or more captured objects 216, 218, 220 in the captured image 266. The bracketed or highlighted object can subsequently be compensated by the control system 236 in a fashion that is different than the rest of the captured image 266.

As provided herein, in certain embodiments, the image apparatus 10 includes selective white balance image correction on the captured image 266. More specifically, the control system 236 evaluates and analyzes the captured image 266 to locate areas of captured photo-emissive objects 218 and the image apparatus 10 performs white balance corrections of areas of the captured image 266 that do not include captured photo-emissive objects. Further, the image apparatus 10 can color compensate for different regions of the captured image 266 at different rates. This can yield more uniform and acceptable white balance in the adjusted image FIG. 3 is a simplified side plan illustration of a combination that includes a image apparatus 310 and a selectively removable outer apparatus frame 338. In this embodiment, the image apparatus 310 is somewhat similar to the corresponding image apparatus 310 described above. However, in this embodiment, the apparatus frame 328 is not waterproof. Instead, in this embodiment, the outer apparatus frame 338 forms an outer shell that surrounds and encloses the apparatus frame 328 and provides a watertight barrier around the electronic components of the image apparatus 310.

In one embodiment, the outer apparatus frame 338 is at least partly made of a clear material. Moreover, the outer apparatus frame 338 can include one or more pass through switches 370 that can be used to control the operation of the control switches 368 of the image apparatus 310.

Figure 4A:
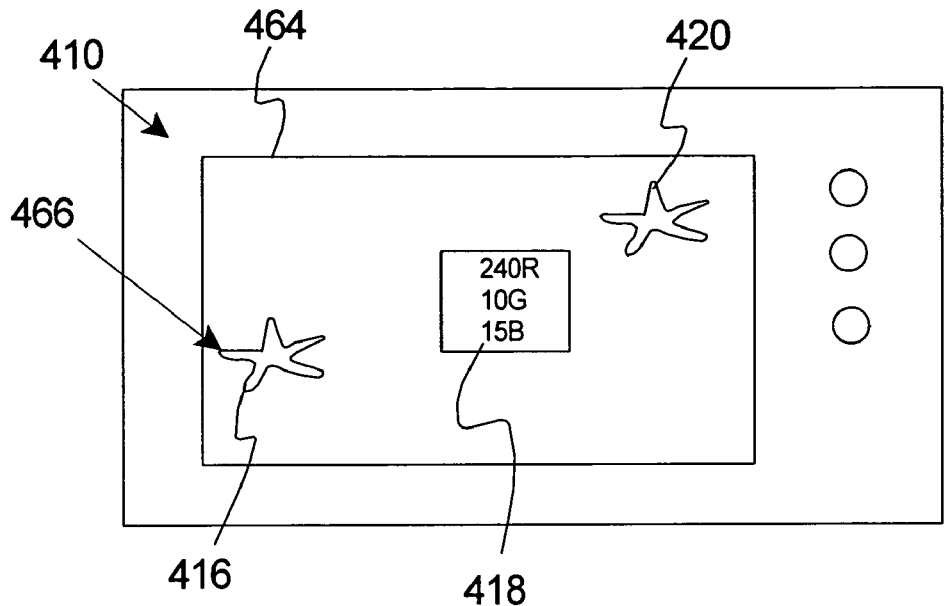
FIG. 4A is a simplified rear view of the image apparatus displaying a captured image of the scene.

FIG. 4A illustrates a rear view of the image apparatus 410 with a raw captured image 466 displayed on the image display 464. The raw captured image 466 is the image of the scene 12 (illustrated in FIG. 1) that is originally captured by the capturing system 232 (illustrated in FIG. 2A). In FIG. 4A, the captured image 466 has captured an image of the objects 16, 18, 20 (illustrated in FIG. 1) as a captured first object 416, a captured second object 418, and a captured third object 420. As provided above, the second object 18 is photo-emissive and the second object 18 emits colors of a defined wavelength at a distance from the image apparatus 410 which is relatively short, and therefore does not get appreciably attenuated by the fluid 14 (illustrated in FIG. 1).

As a result thereof, the red in the second object 18 is not significantly attenuated and the captured second object 418 in the captured image 466 accurately captures the color of the second object 418. In FIG. 4A, the color of the second object 18 can expressed as an amount of red R, green G, and blue B. For example, the second object 18 can have a color composition that is expressed as 240R(red)+10G(green)+15B (blue). It should be noted that the numbers for red, green and blue above are the tonal values on a scale of 0 to 255. Further, for example, a color composition 255R(red)+255G(green)+255B(blue) is pure white, a color composition of 0R(red)+0G(green)+0B(blue) is pure black, and a color composition of 127R(red)+127G(green)+127B(blue) is middle grey.

Figure 4B:
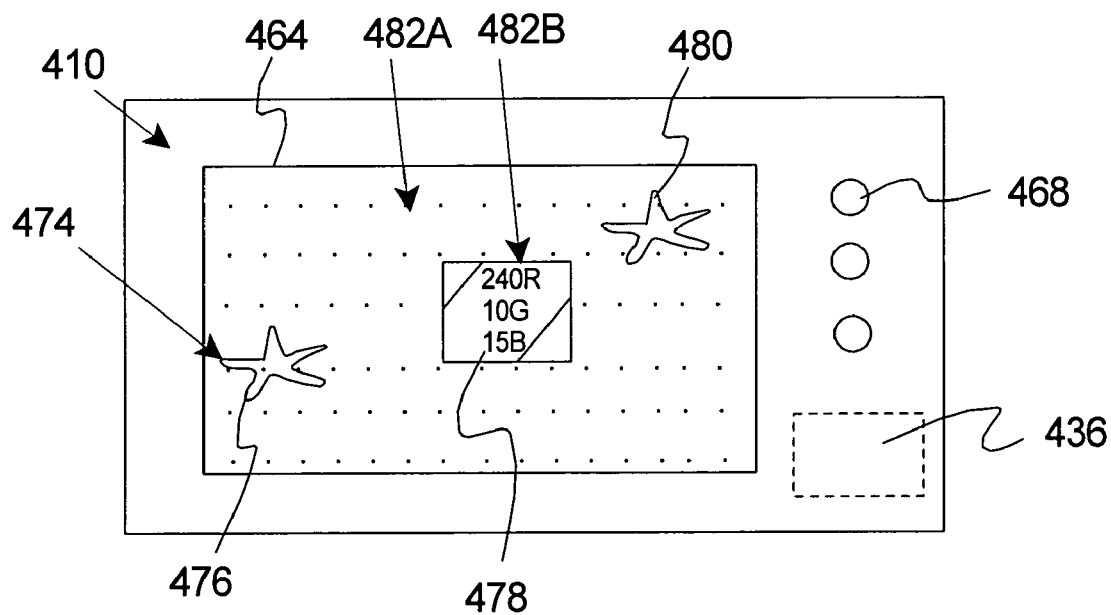
FIG. 4B is a simplified rear view of the image apparatus displaying an adjusted image of the scene.

FIG. 4B illustrates a rear view of the image apparatus 410 with an adjusted image 474 displayed on the image display 464. The adjusted image 474 is the image that results from adjustments made to the raw captured image 466 by the control system 436. Stated in another fashion, the control system 436 adjusts the raw captured image 466 to provide the resulting adjusted image 474. The resulting adjusted image 474 includes an adjusted first object 476, an adjusted second object 478, and an adjusted third object 480.

As is known, the color of light reflected from the objects 16, 18, 20 (illustrated in FIG. 1) will vary according to the color of the light source that is illuminating the scene. As provided herein, the control system 436 includes software that adjusts the colors in at least a portion a captured image 466 according to the color of the light source. This is commonly referred to as white balance correction. With white balance correction, the digital camera can compensate for variations in the color of the light source and the actual color of the objects in the scene are more accurately represented in an adjusted image.

In one embodiment, the image apparatus 410 measures the color temperature of a light source 23 (illustrated in FIG. 1) as an objective measure of the color of the light source 23. The color temperature is defined with reference to the temperature to which an object would have to be heated to radiate light in the same wavelengths. For example, light sources with a color temperature in range of 5,000-5,500 K appear white, light sources with a lower color temperature appear slightly yellow or red and light sources with a light color temperature appear tinged with blue. With the present invention, the control system 436 performs selective white balance correction to compensate for variations in the color of the light source 23. The color of the light source 23 can be measured with the image sensor 248 (illustrated in FIG. 2A), the RBG sensor 262 (illustrated in FIG. 2A), an ambient light sensor (not shown) or another type of sensor.

With the color of the light source 23, the control system 436 can provide white balance correction by adjusting the amounts of red, blue and green in the captured image 466 to achieve the adjusted image 474.

Alternatively, for example, a white card, a grey card, or any card with a know red/green/blue content can be used to measure the white balance. The value of white balance in one image can be used in other images. With information regarding the white balance, the control system 436 can provide white balance correction by adjusting the amounts of red, blue and green in the captured image 466 to achieve the adjusted image 474.

In one embodiment, the control system 436 selectively provides white balance correction in the raw captured image 466 to provide the adjusted image 474. More specifically, in FIG. 4B, the control system 436 has performed a first level (represented as ".") of white balance correction on at a first region 482A of the captured image 466 and has performed a second level (represented as "/") of white balance correction on a second region 482B of the captured image 466.

In FIG. 4B, the background, the adjusted first object 476, and the adjusted third object 480 are in the first region 476A and were subjected to the first level of white balance correction. Further, the adjusted second object 478 was subjected to the second level of white balance correction.

The difference in white balance correction between the first level and the second level can vary. As provided above, the tonal values of red, green, and blue can be expressed on a scale of 0 to 255. In one embodiment, in the first level of white balance correction, the each of the red, green, and blue tonal values can be attenuated or amplified at a first rate, and in the second level of white balance correction, the each of the red, green, and blue tonal values can be attenuated or amplified at a second rate that is different than the first rate. In one non-exclusive embodiment, (i) in the first level of white balance correction, the red tonal values are amplified approximately 25 percent, the green tonal values are amplified approximately 10 percent, and the blue tonal values are attenuated approximately 15 percent, and (ii) in the second level of white balance correction, the red tonal values are not changed, the green tonal values are amplified approximately 5 percent, and the blue tonal values are amplified approximately 10 percent.

In FIG. 4B, the adjusted second object 478 is a photo-emissive object that is located in the second region 482B and received only the second level of white balance correction. Because the second object 18 is fluorescent and the captured second object 418 accurately captures the colors of the second object 18, the control system 436 applies a significantly lesser amount, e.g. approximately zero white balance correction to the second region 482B. With this design, the control system 436 can provide the adjusted image 474 having a more uniform and acceptable white balance correction.

The size of each region 482A, 482B can vary according to the scene 12 that is captured. In one embodiment, the second region 482B is approximately equal in size to the captured photo-emissive object 418 and the first region 482A is approximately equal in size to the rest of the captured image 466. Alternatively, each region 482A, 482B can be another size.

In one embodiment, the control system 436 identifies the captured photo-emissive object 418 in the raw captured image 466. With this design, in certain embodiments, the control system 436 can perform a different level of image compensation on the captured photo-emissive object 418 than on other portions of the captured image 466.

In one embodiment, the control system 436 identifies the captured photo-emissive object 418 by evaluating the red component of raw captured image 466. For example, if a region of the raw captured image 466 has a red component that is greater than an EO red level, this region can be considered a captured photo-emissive object 418. With this design, for example, the software in the control system 436 can be used to isolate this region from rest of the captured image 466. Stated in another fashion, the control system 436 can perform white balance correction on a portion of the captured image 466 and the control system 436 can isolate the captured photo-emissive object 418 from white balance correction.

The amount of red that is the EO red level can depend on the attenuation of light in the fluid. For example, attenuation is largely dependent on the depth. Thus, the amount of red that qualifies as the threshold EO red level will depend upon the depth of the scene 12. In alternative, non-exclusive examples, at a know depth, if a small area has a red tonal value of greater than approximately 180, 200, 220, or 250 then that area could be considered a captured photo-emissive object 418. Stated in another fashion, in alternative, non-exclusive examples, if a small area has a red tonal value that is approximately 50, 70, 100, 120, 140, 150, 170, 200, 220 greater than the red tonal value of the rest of the captured image, that area could be considered a captured photo-emissive object 418.

Somewhat similar levels can be used with other colors to identify a captured photo-emissive object 418.

In another embodiment, the user can utilize one or more of the control switches 468 to manually bracket, highlight or otherwise identify the second region 482B and/or captured photo-emissive objects 418 in the captured image 466. After identifying the second region 482B, the control system 436 can perform the different levels of white balance correction.

Figure 5:
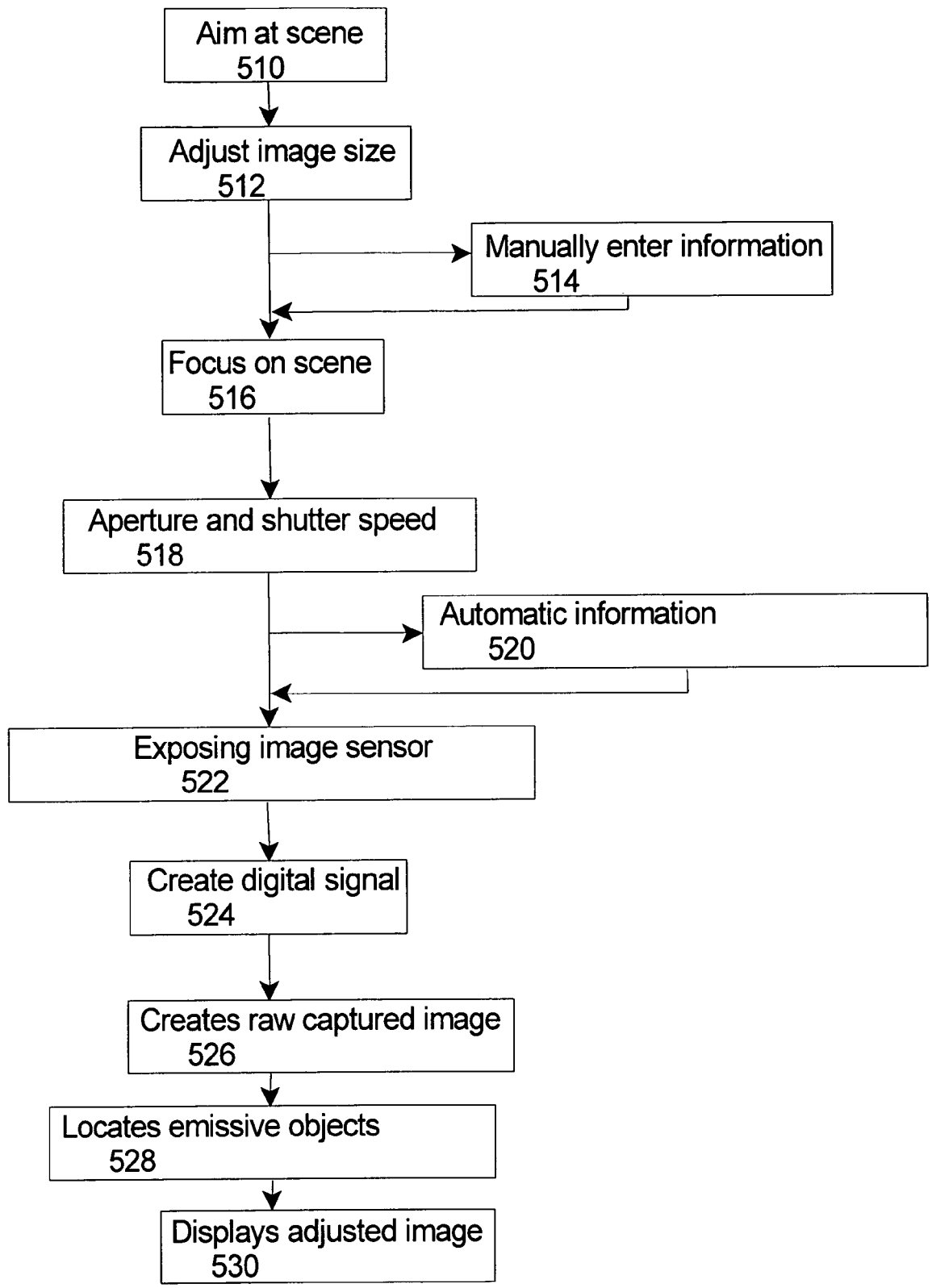
FIG. 5 is a simplified flow chart that further illustrates one embodiment of the present invention.

FIG. 5 is a simplified flow chart that further illustrates one non-exclusive example the image apparatus. It should be noted that one or more of the steps can be omitted or the order of steps can be switched. First, the image apparatus is aimed toward the scene 510. Second, the user adjusts the zoom so as to adjust the size of the image as desired 512. Next, the user can manually enter information the apparatus depth AD into the image apparatus 514. Next, the user presses lightly on the shutter button to enable the image apparatus to automatically focus on the object(s) 516. Subsequently, the image apparatus sets the aperture and shutter speed 518. Simultaneously, the control system can receive information from one or more sensors relating to colors in the scene and the apparatus depth AD 520. Subsequently, the user presses the shutter button all the way, which resets the image sensor, and opens the first shutter blade thereby exposing the image sensor to light, building up an electrical charge until the second shutter blade closes thereby preventing further light from reaching the image sensor 522. Next, the ADC measures the charge at each photosite of the image sensor and creates a digital signal that represents the values of the charge at each photosite 524. Subsequently, the control system interpolates the data from the different photosites, with assistance from the filtering component, to create the raw captured image 526. Next, the control system locates photo-emissive object(s) in the captured image 528. Finally, the control system selectively applies white balance compensation to the raw captured image to get the adjusted image, and displays the adjusted image 530.

Figure 6A:
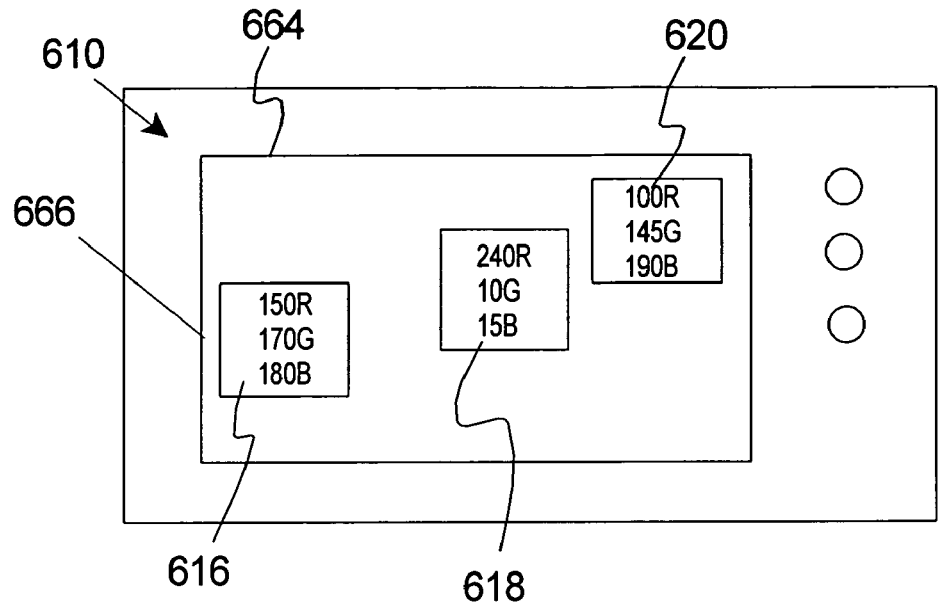
FIG. 6A is a simplified rear view of the image apparatus displaying another captured image of the scene.

FIG. 6A illustrates a rear view of the image apparatus 610 with another raw captured image 666 displayed on the image display 664. The raw captured image 666 is the image of a scene (not shown) that is originally captured by the capturing system 232 (illustrated in FIG. 2A). In FIG. 6A, the captured image 666 has captured an image of three objects (not shown) as a captured first object 616, a captured second object 618, and a captured third object 620. The colors of the captured objects 616, 618, 620 are expressed as tonal values of R for red, B for blue, and G for green on a scale of 0-255.

In this embodiment, the second object 618 is photo-emissive and the second object 618 emits colors of a defined wavelength at a distance from the image apparatus 610 which is relatively short, and therefore does not get appreciably attenuated by the fluid 14 (illustrated in FIG. 1) and the captured image 666 accurately captures the color of the second object 618. Further, in this embodiment, the first object 616 and the third object 620 are substantially identical in color. However, the first object 616 is located closer to the light source 23 (illustrated in FIG. 1) than the third object 618. As a result thereof, for the captured image 466, the captured first object 616 has more red than the captured third object 620. Thus, the captured image 666 does not accurately reflect the true colors of the scene.

In this example, the color of the captured second object 618 can be expressed as having a color composition that is expressed as 240R(red)+10G(green)+15B(blue); the color of the captured first object 616 can be expressed as having a color composition that is expressed as 150R(red)+170G(green)+180B(blue); and the color of the captured third object 620 can be expressed as having a color composition that is expressed as 100R(red)+145(green)+190B(blue).

Figure 6B:
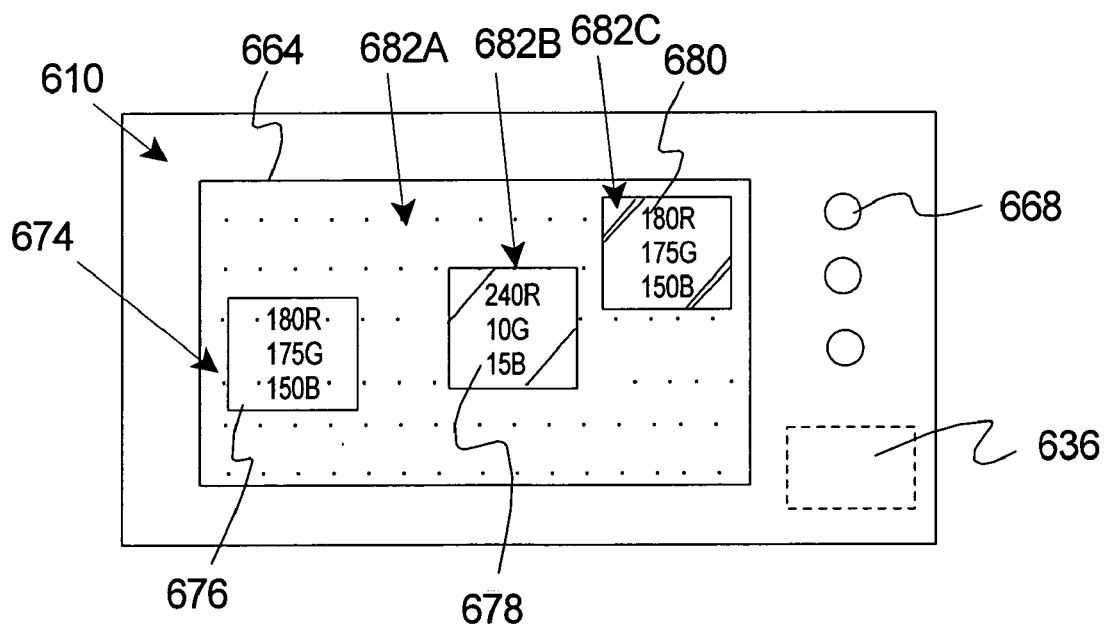
FIG. 6B is a simplified rear view of the image apparatus displaying an adjusted image of the scene.

FIG. 6B illustrates a rear view of the image apparatus 610 with an adjusted image 674 displayed on the image display 664. The adjusted image 674 is the image that results from adjustments made to the raw captured image 666 by the control system 636. Stated in another fashion, the control system 636 adjusts the raw captured image 666 to provide the resulting adjusted image 674. The resulting adjusted image 674 includes an adjusted first object 676, an adjusted second object 678, and an adjusted third object 680.

In this embodiment, the control system 636 selectively provides white balance correction in the raw captured image 666 to provide the adjusted image 674. More specifically, in FIG. 6B, the control system 436 has performed a first level (represented as ".") of white balance correction on at a first region 482A of the captured image 466, has performed a second level (represented as "/") of white balance correction on a second region 482B of the captured image 466, and has performed a third level (represented as "//") of white balance correction on a third region 682C of the captured image 666. Alternatively, the control system 636 can be designed to perform greater than three or less than three levels of white balance correction.

In FIG. 6B, (i) the background, and the adjusted first object 676 are in the first region 676A and were subjected to the first level of white balance correction, (ii) the adjusted second object 678 is in the second region 676B and was subjected to the second level of white balance correction, and (iii) the adjusted third object 680 is in the third region 676C and was subjected to the third level of white balance correction.

As a result of the different white balance correction, in one embodiment, the color of the adjusted captured second object 618 can be expressed as having a color composition that is expressed as 240R(red)+10G(green)+15B(blue); the color of the adjusted captured first object 616 can be expressed as having a color composition that is expressed as 180R(red)+175G(green)+150B(blue); and the color of the adjusted captured third object 620 can be expressed as having a color composition that is expressed as 180R(red)+175G(green)+150B(blue).

The difference in white balance correction between the first level, the second level, and the third level can vary. In one embodiment, the second level is approximately equal to no white balance correction.

In FIG. 6B, the adjusted second object 678 is an photo-emissive object that is located in the second region 682B and received only the second level of white balance correction. Because the second object is fluorescent and the captured second object 618 accurately captures the colors of the second object, the control system 636 applies a significantly lesser amount, e.g. approximately zero white balance correction to the second region 682B. With this design, the control system 636 can provide the adjusted image 674 having a more uniform and acceptable white balance correction. Further, as a result thereof, the colors of the adjusted third object 680 more closely approach the colors of the adjusted first object 676.

The size of each region 682A, 682B, 682C can vary according to the scene that is captured. In one embodiment, the second region 682B is approximately equal in size to the captured photo-emissive object 618, the third region 682C is approximately equal in size to the captured third object 620, and the first region 682A is approximately equal in size to the rest of the captured image 666. Alternatively, each region 682A, 682B, 682C can be another size.

In one embodiment, the control system 636 identifies the captured photo-emissive object 618 in the raw captured image 666. With this design, in certain embodiments, the control system 636 can perform a different level of image compensation on the captured photo-emissive object 618 than on other portions of the captured image 666.

In this embodiment, the control system 636 again identifies the captured photo-emissive object 618 by evaluating the red component of raw captured image 666. For example, if a region of the raw captured image 666 has a red component that is greater than an EO red level, this region can be considered a captured photo-emissive object 618. With this design, for example, the software in the control system 636 can be used to isolate this region from rest of the captured image 666.

In one version, the control system 636 identifies the amount of red in the captured image 666 and performs white balance correction based on the amount of red in the captured image 666. For example, the control system 636 can perform (i) the first level of white balance correction in the first region 682A if the first region 682A has a first level of red, (ii) the second level of white balance correction in the second region 682B if the second region 682B has a second level of red, and (iii) the third level of white balance correction in the third region 682C if the third region 682C has a third level of red. With this design, for example, if the scene is illuminated by a light source, the control system 636 can perform different levels of white balance correction on the objects in the scene based on which objects are closest to the light source.

Additionally, or alternatively, the control system 636 can identify the amount of green or blue in the captured image 666 and perform white balance correction based on the amount of green or blue in the captured image 666.

In another embodiment, the user can utilize one or more of the control switches 668 to manually bracket, highlight or otherwise identify the regions 682A, 682B, 682C for selective white balance compensation. After identifying the various regions 682A, 682B, 682C, the control system 636 can perform the different levels of white balance correction.

Figure 7:
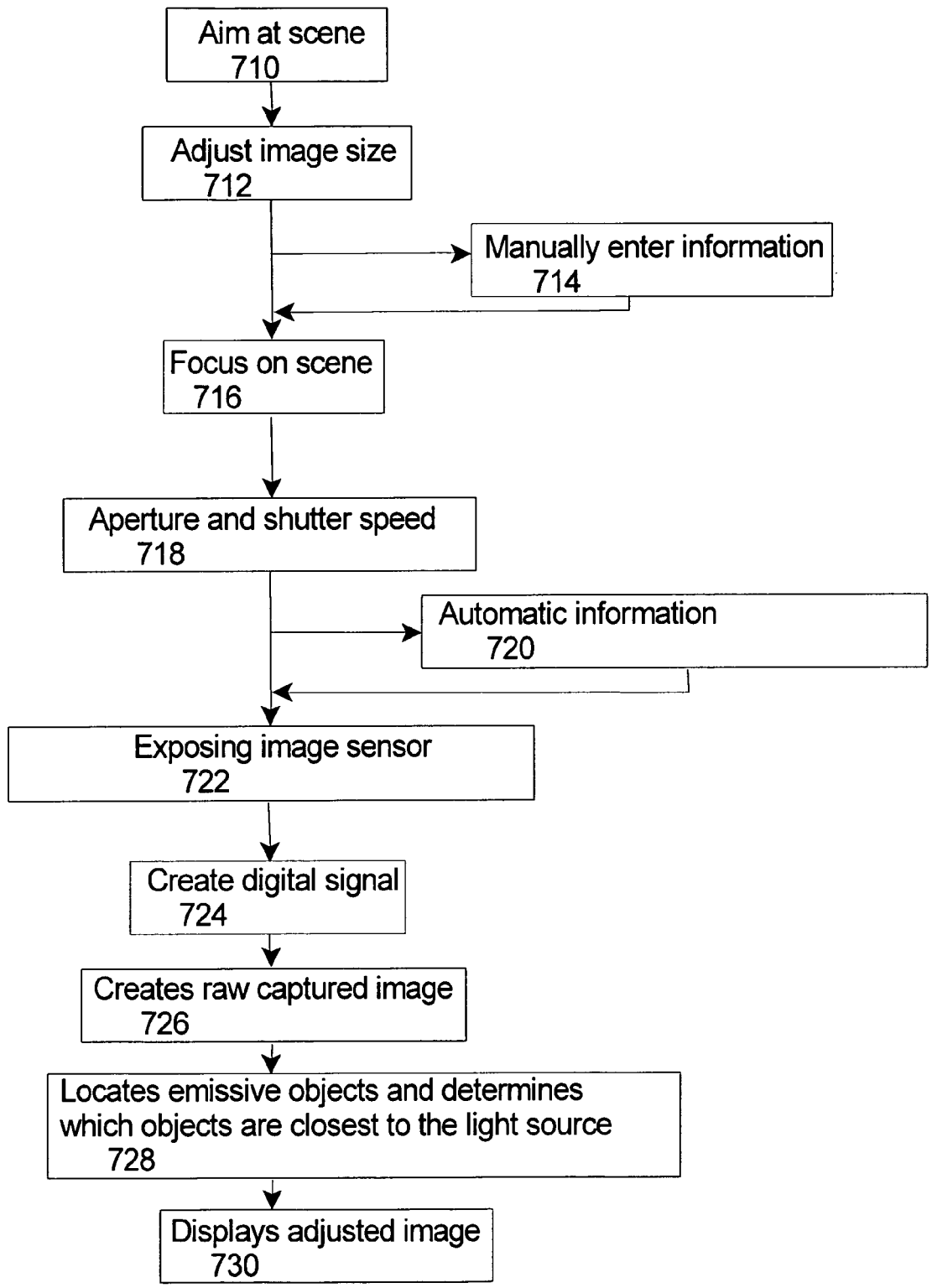
FIG. 7 is a simplified flow chart that further illustrates one embodiment of the present invention.

FIG. 7 is a simplified flow chart that further illustrates one non-exclusive example the image apparatus. It should be noted that one or more of the steps can be omitted or the order of steps can be switched. First, the image apparatus is aimed toward the scene 710. Second, the user adjusts the zoom so as to adjust the size of the image as desired 712. Next, the user can manually enter information the apparatus depth AD into the image apparatus 714. Next, the user presses lightly on the shutter button to enable the image apparatus to automatically focus on the object(s) 716. Subsequently, the image apparatus sets the aperture and shutter speed 718. Simultaneously, the control system can receive information from one or more sensors relating to colors in the scene and the apparatus depth AD 720. Subsequently, the user presses the shutter button all the way, which resets the image sensor, and opens the first shutter blade thereby exposing the image sensor to light, building up an electrical charge until the second shutter blade closes thereby preventing further light from reaching the image sensor 722. Next, the ADC measures the charge at each photosite of the image sensor and creates a digital signal that represents the values of the charge at each photosite 724. Subsequently, the control system interpolates the data from the different photosites, with assistance from the filtering component, to create the raw captured image 726. Next, the control system locates photo-emissive object(s) in the captured image and determines which objects are closest to the light source 728. Finally, the control system selectively applies white balance compensation to the raw captured image to get the adjusted image, and displays the adjusted image 730.

In another embodiment, a photo-emissive surface can be pre-sampled to identify the photo-emissive surface (e.g. the photo-emissive color) to the control system, or by entering it manually.

It should be noted that the image apparatuses provided herein are particularly useful for capturing an image of a scene that is under a fluid.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image apparatus for providing an adjusted image of a scene that includes a photo-emissive object, the image apparatus comprising:
an apparatus frame;
a capturing system secured to the apparatus frame, the capturing system capturing a captured image of the scene; and
a control system coupled to the apparatus frame, the control system identifying a captured photo-emissive object in the captured image, the control system performing a first level of white balance correction on a first region of the captured image and performing a second level of white balance correction on a second region of the captured image, the second level of white balance correction being different than the first level of white balance correction.

2. The image apparatus of claim 1 wherein the captured photo-emissive object is located in the second region of the captured image.

3. The image apparatus of claim 1 wherein the second level of white balance correction is approximately the same as no white balance correction.

4. The image apparatus of claim 1 wherein the control system performs a third level of white balance correction on a third region of captured image, the third level of white balance correction being different than the first level of white balance correction and the second level of white balance correction.

5. The image apparatus of claim 1 wherein the control system identifies areas of red in the captured image and wherein if the control system determines that the first region includes more red than the second region, the second level of white balance correction is greater than the first level of white balance correction.

6. The image apparatus of claim 1 wherein the apparatus frame is watertight and forms a watertight compartment that protects the capturing system.

7. The image apparatus of claim 1 further comprising an apparatus depth sensor that measures the depth of a portion of the image apparatus under a fluid surface.

8. A method for providing an adjusted image of a scene that includes an photo-emissive object, the method comprising the steps of:
providing an apparatus frame;
capturing a captured image of the scene with a capturing system, the capturing system being secured to the apparatus frame;
identifying a captured photo-emissive object in the captured image with a control system, the control system being coupled to the apparatus frame;
performing a first level of white balance correction on at a first region of the captured image with the control system; and
performing a second level of white balance correction on a second region of the captured image with the control system, the second level of white balance correction being different than the first level of white balance correction.

9. The method of claim 8 further comprising the step of performing a third level of white balance correction on a third region of captured image with the controls system, the third level of white balance correction being different than the first level of white balance correction and the second level of white balance correction.

10. The method of claim 8 further comprising the step of identifying areas of red in the captured image with the control system.

11. The method of claim 8 further comprising the step of identifying areas of red in the captured image with the control system, and wherein if the control system determines that the first region includes more red than the second region, the steps of performing a first level of white balance correction on the first region and performing a second level of white balance correction on the second region includes the second level of white balance correction being greater than the first level of white balance correction.

12. The method of claim 8 wherein the step of providing an apparatus frame includes the steps of making the apparatus frame watertight and forming a watertight compartment that protects the capturing system.

13. The method of claim 8 further comprising the step of measuring the depth of the capturing system under a fluid surface with an apparatus depth sensor.

14. An image apparatus for providing an adjusted image of a scene that includes a photo-emissive object, the image apparatus comprising:
an apparatus frame;
a capturing system secured to the apparatus frame, the capturing system capturing a captured image of the scene; and
a control system coupled to the apparatus frame, the control system identifying a captured photo-emissive object in the captured image, wherein the photo-emissive object absorbs light energy and re-emits the light energy at a defined wavelength.

15. The image apparatus of claim 14 wherein the control system detects the defined wavelength of the light energy from the photo-emissive object.

16. An image apparatus for providing an adjusted image of a scene that includes a photo-emissive object, the image apparatus comprising:
an apparatus frame;
a capturing system secured to the apparatus frame, the capturing system capturing a captured image of the scene; and
a control system coupled to the apparatus frame, the control system identifying a captured photo-emissive object in the captured image, wherein the control system identifies areas of red or another color that corresponds to the captured photo-emissive object in the captured image to identify the captured photo-emissive object.

17. An image apparatus for providing an adjusted image of a scene that includes a photo-emissive object, the image apparatus comprising:
an apparatus frame;
a capturing system secured to the apparatus frame, the capturing system capturing a captured image of the scene; and
a control system coupled to the apparatus frame, the control system identifying a captured photo-emissive object in the captured image, wherein the control system performs white balance correction on a portion of the captured image and wherein the captured photo-emissive object is isolated from white balance correction.

18. A method for providing an adjusted image of a scene that includes an photo-emissive object, the method comprising the steps of:
providing an apparatus frame;
capturing a captured image of the scene with a capturing system, the capturing system being secured to the apparatus frame; and identifying a captured photo-emissive object in the captured image with a control system, the control system being coupled to the apparatus frame, the control system identifying areas of red in the captured image to identify the captured photo-emissive object.

19. A method for providing an adjusted image of a scene that includes an photo-emissive object, the method comprising the steps of:

providing an apparatus frame;

capturing a captured image of the scene with a capturing system, the capturing system being secured to the apparatus frame;

identifying a captured photo-emissive object in the captured image with a control system, the control system being coupled to the apparatus frame;

performing white balance correction on a portion of the captured image with the control system; and isolating the captured photo-emissive object from white balance correction.

20. A method for providing an adjusted image of a scene that includes an photo-emissive object, the method comprising the steps of:

providing an apparatus frame;

capturing a captured image of the scene with a capturing system, the capturing system being secured to the apparatus frame;

identifying a captured photo-emissive object in the captured image with a control system, the control system being coupled to the apparatus frame, the photo-emissive object absorbing light energy and re-emitting the light energy at a defined wavelength.

21. The method of claim 20 wherein the step of identifying includes the step of the control system detecting the defined wavelength of the light energy from the photo-emissive object.

* * * * *